(12) United States Patent
Harrison (10) Patent No.: US 7,798,752 B2
(45) Date of Patent: Sep. 21, 2010

(54) HOLDING RACK FOR MOUNTING ON TRUCK TAILGATES

(76) Inventor: Frank Harrison, P.O. Box 411824, Kansas City, MO (US) 64141

( * ) Notice: Subject to any disclaimer, the term of this patent is extended or adjusted under 35 U.S.C. 154(b) by 765 days.

(21) Appl. No.: 11/755,928

(22) Filed: May 31, 2007

(65) Prior Publication Data

US 2007/0222246 A1    Sep. 27, 2007

Related U.S. Application Data

(63) Continuation of application No. 11/161,341, filed on Jul. 29, 2005, now abandoned.

(51) Int. Cl.
*B60P 7/08*    (2006.01)

(52) U.S. Cl. ............................. 410/35; 410/34; 410/38; 410/121; 296/51

(58) Field of Classification Search .................. 410/32, 410/34, 35, 36, 37, 38, 121, 89, 94, 129, 410/153; 296/3, 51, 57.1, 26.05, 26.06, 26.07, 296/26.09, 26.1, 26.11, 39.2; 224/405, 281, 224/282, 496, 497, 499, 502, 510, 525, 42.34, 224/549, 553, 554
See application file for complete search history.

(56) References Cited

U.S. PATENT DOCUMENTS 6,210,087 B1 *   4/2001   Bacon .......................... 410/35

* cited by examiner

*Primary Examiner*—Stephen Gordon
(74) *Attorney, Agent, or Firm*—Hovey Williams LLP

(57) ABSTRACT

A holding rack for mounting on truck tailgates is disclosed. The inventive holding rack is used with a truck bed to securely haul loads with a truck. The holding rack broadly includes a rack body for receiving the load, a hold-down mechanism that attaches to the rack body to engage the load, and a support frame. The support frame attaches to the tailgate and shiftably receives the holding rack and thereby permits placement of the rack in a stored position and in a load-supporting position where the load is secured while the tailgate is in its upright, latched position.

13 Claims, 7 Drawing Sheets

HOLDING RACK FOR MOUNTING ON TRUCK TAILGATES

RELATED APPLICATION

This is a continuation of application Ser. No. 11/161,341 filed Jul. 29, 2005, which is hereby incorporated by reference herein.

BACKGROUND OF THE INVENTION

1. Field of the Invention

The present invention relates generally to the field of supporting racks used to secure loads within a truck bed. More specifically, the present invention concerns a holding rack that is shiftably mounted to a truck tailgate to be storable next to the tailgate and extendable above the tailgate to support a load.

2. Discussion of Prior Art

Automobiles often provide an external storage area for hauling various loads. Pick-up trucks in particular usually provide a truck bed to serve this function. In their usual form, truck beds include a floor with fixed sidewalls extending above the floor and a tailgate that acts as a sidewall but may be opened to provide access to the truck bed. Therefore, the truck bed normally provides a partially enclosed space for hauling various loads. However, this space often requires the use of additional equipment in order to safely and securely organize a load within the truck bed.

The after-market automotive product industry offers a broad range of products for use with pick-up trucks. In particular, some of these products work with the truck bed to organize or secure loads relative to the truck bed, but these products have several limitations. One limitation is that these organizers are bulky and fill a significant amount of space within or above the truck bed, even when the user is not hauling a load. Another limitation of prior art organizers is that they are difficult to use. Loads commonly shift during transportation and this shifting sometimes causes the securing mechanism (e.g., ratchet straps, chains, etc.) to become loose and ineffective at securing the load. This also makes the prior art organizers time consuming to use because a user must anticipate how a load will shift during transport and therefore must consider how best to secure it. Accordingly, there is a need for an improved organizing device for use with truck beds that does not suffer from these problems and limitations.

OBJECTS AND SUMMARY OF THE INVENTION

The present invention provides a holding rack for pick-up trucks that does not suffer from the problems and limitations of the prior art detailed above.

In particular, a first aspect of the present invention concerns a pick-up truck for securely hauling a load that is supported on the truck. The pick-up truck broadly includes a truck bed and a holding rack operable to secure the load. The truck bed includes a floor with spaced apart forward and rearward ends and a sidewall extending along the periphery of the floor. The sidewall presents a rear section extending along the rearward end of the bed. The rear section presents a laterally extending upper edge and an exposed interior surface that extends from the upper edge downwardly toward the floor. The holding rack includes a rack body that is shiftably coupled relative to the interior surface to be shiftable between a stored position and a load-supporting position. The rack body defines a plurality of slots spaced along the rearward end. The slots are configured to receive and support the load. The rack body is positioned below the upper edge and alongside the interior surface in a generally parallel relationship thereto so that the rack body is located entirely within the truck bed when said rack body is in the stored position. The rack body extends uprightly above the upper edge and the truck bed when in the load-supporting position for supporting the load.

A second aspect of the present invention concerns a holding rack for mounting on truck tailgates. The truck includes a tailgate defining in part an enclosed storage space of a truck bed. The holding rack is operable to secure a load that is longer than the truck bed by supporting the load as it extends out of the enclosed space. The latched tailgate presents a top edge and an exposed upright surface extending below the top edge. The upright surface partially defines the enclosed space. The holding rack broadly includes a rack body defining a slot for receiving the load therein, and a support frame configured to support the rack body on the tailgate. The support frame is for positioning the rack body into a load-supporting position in which the slot projects above the tailgate and the load can be received therein while being partially supported on the floor of the truck bed. The support frame is a tailgate liner.

A third aspect of the present invention concerns a pick-up truck for securely hauling a load that is supported on the truck. The pick-up truck broadly includes a truck bed and a holding rack operable to secure the load. The truck bed includes a floor with spaced apart forward and rearward ends and a sidewall extending along the periphery of the floor. The sidewall presents a rear section extending along the rearward end of the bed. The rear section presents a laterally extending upper edge and an exposed interior surface that extends from the upper edge downwardly toward the floor. The holding rack includes a support frame and a rack body shiftably coupled relative to the support frame to be shiftable between a stored position and a load-supporting position. The rack body defines a plurality of slots spaced along the rearward end. The slots are configured to receive and support the load. The rack body is positioned below the upper edge and alongside the interior surface in a generally parallel relationship thereto so that the rack body is located entirely within the truck bed when said rack body is in the stored position. The rack body extends uprightly above the upper edge and the truck bed when in the load-supporting position for supporting the load. The support frame is a tailgate liner.

A fourth aspect of the present inventions concerns a method for securing a load relative to a truck bed. The method broadly includes the steps of shifting a slotted rack body and placing the load in one of the slots of the rack body. The shifting step including shifting the slotted rack body from a stored position within the truck bed to a load-supporting position spaced above the tailgate while the rack body is attached to the interior surface of the tailgate. The placing step including placing the load in one of the slots of the rack body when in the load-supporting position so that a first end of the load is located within the truck bed and is supported by the floor and a second end of the load is spaced rearwardly of the truck bed.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

DETAILED DESCRIPTION OF THE PREFERRED EMBODIMENTS

Figure 1:
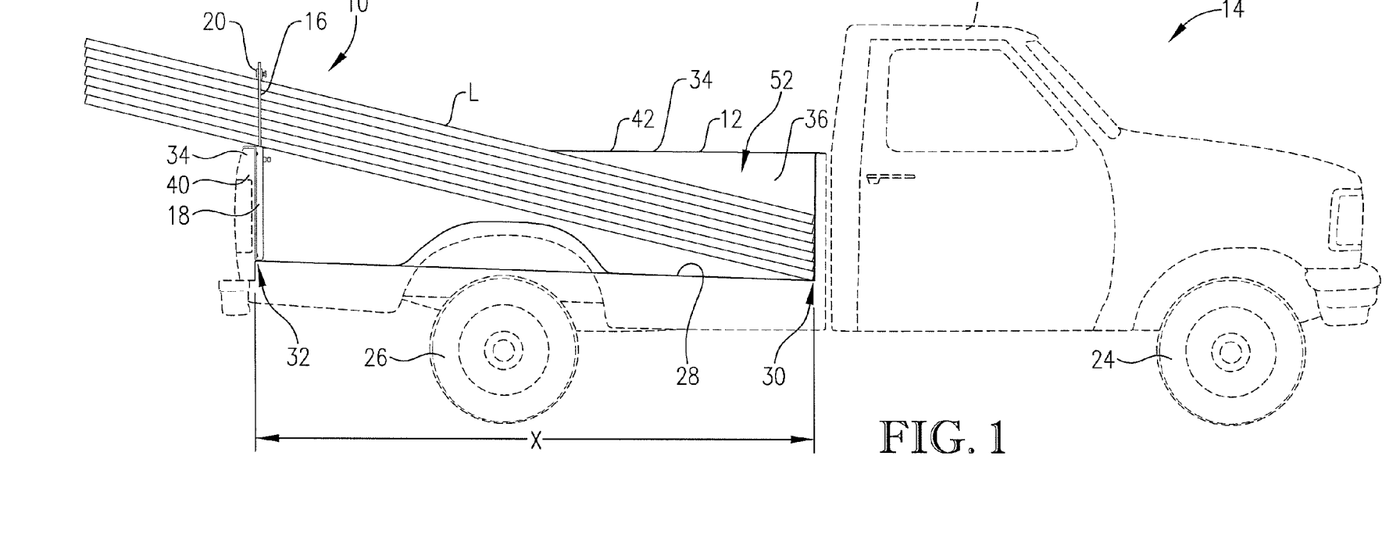
FIG. 1 is a side elevation view of a pick-up truck including a holding rack constructed in accordance with a preferred embodiment of the present invention.

FIG. 1 illustrates a holding rack 10 for mounting on truck tailgates constructed in accordance with a preferred embodiment of the present invention. The holding rack 10 is shown in use with a bed 12 of vehicle 14 for hauling load L. However, it is consistent with the principles of the present invention that the holding rack can be used with a trailer or other wheeled vehicle whose intended purpose is for load-hauling. The holding rack 10 broadly includes a rack body 16, a support frame 18, and a hold-down bar 20.

The illustrated vehicle 14 shown in FIG. 1 is a pick-up truck with a cab 22, front wheels 24, rear wheels 26, and the truck bed 12 mounted behind the cab 22. The truck bed 12 includes a rectangular floor 28 with front and rear ends 30,32. The floor of the truck bed has a length X generally of 4-8 feet and a width Y of 36-55 inches. The floor 28 is surrounded by sidewall 34 extending up from the periphery of the floor 28. Longitudinal sections 36 of sidewall 34 extend between the ends 30,32. An end section 38 of sidewall 34 extends along the front end 30, and a rear section 40 extends along the rear end 32. The end section 38 and the longitudinal sections 36 are interconnected to form a continuous wall around the floor 28. In the illustrated embodiments, the rear section 40 is a tailgate that is rotatably coupled to the longitudinal sections 36 to be selectively opened and closed by a user. However, it is within the ambit of the present invention that the rear section 40 can be fixed in an upright position. The sidewall 34 defines a top edge 42 with stake holes 44 extending vertically through the top edge 42. The floor 28 and sidewall 34 are constructed of formed steel in the usual manner. However, it is consistent with the principles of the present invention that floor 28 and sidewall 34 could be constructed of wood, aluminum, or plastic.

Figure 4:
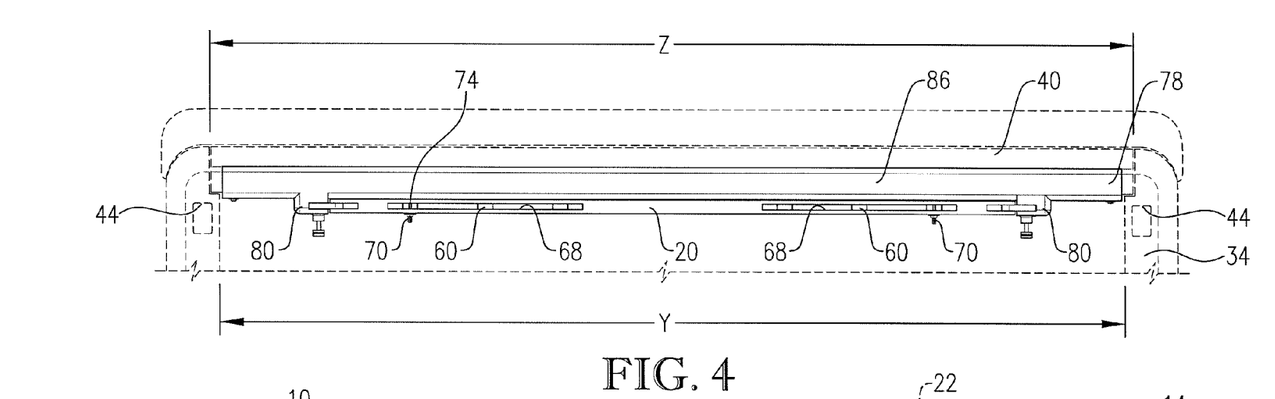
FIG. 4 is a fragmentary plan view of the pick-up truck including the holding rack depicted in FIG. 1.
Figure 5:
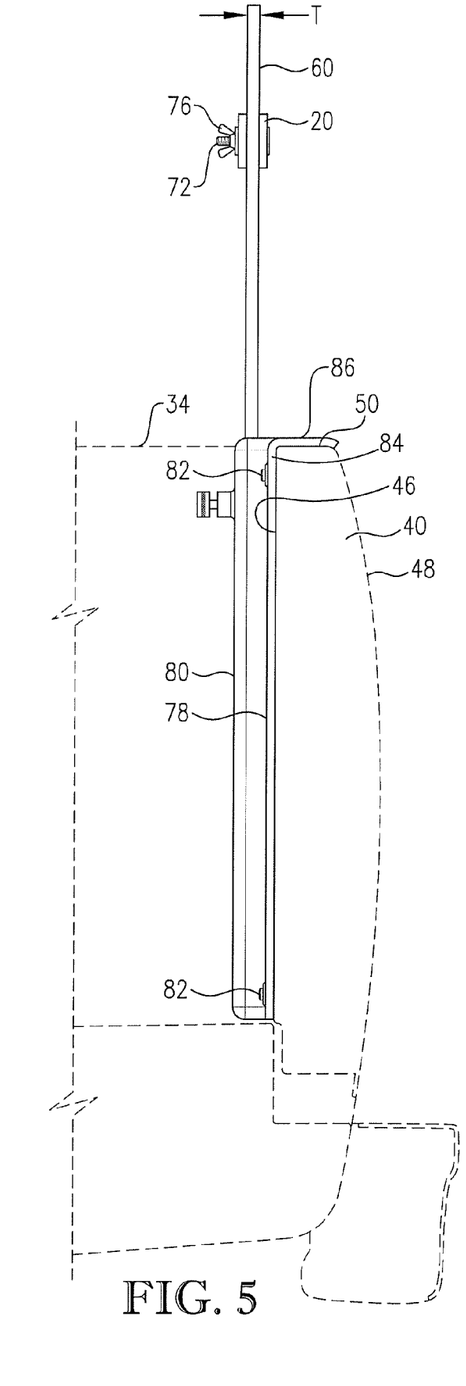
FIG. 5 is an enlarged fragmentary side elevation view of the pick-up truck including the holding rack depicted in FIG. 1 with the rack body in the load-supporting position.

As noted above, the rear section 40 is rotatably coupled to longitudinal sections 36 by hinges (not shown) for selective opening or closing of the truck bed 12. Turning to FIGS. 4 and 5, the rear section 40 includes a latch mechanism (not shown) that combines with the hinge to releasably fix the rear section 40 to the sidewalls 34 in an upright position that encloses the rear end 32. The rear section 40, similar to the rest of the truck bed 12, is constructed of sheet metal. The rear section 40 presents several exposed surfaces including an inner side surface 46, an outer side surface 48 and an upper edge 50. The inner side surface 46 is generally planar, but in the usual manner has spaced apart ridges (not shown) formed into the sheet metal to provide rigidity. The outer side surface 48 is generally parallel with the inner side surface 46, but may include curves or ridges to provide rigidity or to form visible indicia. The upper edge 50 forms part of the top edge 42. Tailgates generally have a length Z between 36-55 inches, which is normally about the width of the corresponding truck bed floor 28.

The rear section 40 is rotatable into and out of a horizontal position, where the inner side surface 46 is substantially horizontal and faces upward, to provide greater access to the space within the truck bed 12. Similarly, the rear section 40 is rotatable into and out of an upright position where the inner side surface 46 is substantially vertical and faces toward the front end 30. In the upright position, the latch mechanism is operable to engage the longitudinal sections 36 and thereby releasably fix the rear section 40 in place. The rear section 40 cooperates with the end section 38 and longitudinal sections 36 to define a substantially continuous wall around the floor 28. When the rear section 40 is latched, the floor 28, longitudinal sections 36, end section 38, and the inner side surface 46 cooperate to define an enclosed storage space 52 within the truck bed 12 (see FIG. 1).

Turning to FIGS. 2-8, a preferred embodiment of the holding rack 10 is disclosed. Again, the holding rack 10 broadly includes the rack body 16, the support frame 18 for coupling the rack body 16 to the rear section 40, and the hold-down bar 20. As will be appreciated, the holding rack 10 is particularly useful for securing loads that are longer than the truck bed 12. The holding rack 10 also allows loads to be secured while the rear section 40 is in an upright position. The holding rack 10 accomplishes this by having the rack body 16 which is shiftable relative to the rear section 40.

Figures 7, 8:
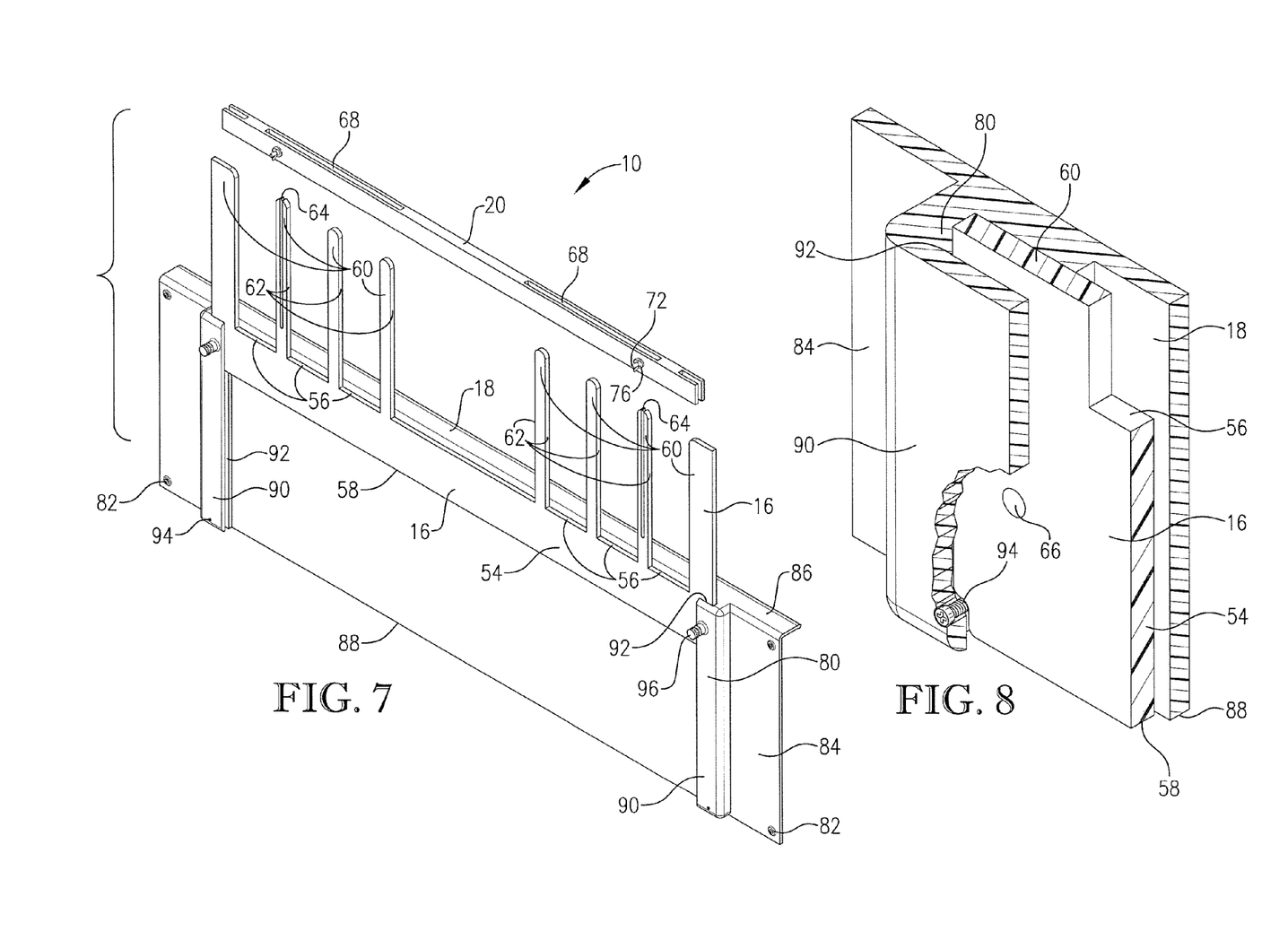
FIG. 7 is a perspective assembly view of the holding rack illustrated in FIG. 1, showing the hold-down bar detached from the rack body.
FIG. 8 is a greatly enlarged fragmentary perspective sectional view of the holding rack illustrated in FIG. 1, showing the rack body in the stored position relative to the rack guide.

In the illustrated embodiment of FIG. 7, the rack body 16 has a unitary construction and is substantially planar. The rack body 16 includes a laterally extending section 54 with upper and lower edges 56,58 and a plurality of fingers 60 extending orthogonally to the section 54. The fingers 60 cooperate with the section 54 to provide generally rectangular slots 62 for receiving the load L. As will be discussed shortly, some of the fingers 60 have thin slots 64 to receive the hold-down bar 20. As shown in FIG. 8, the rack body 16 also includes spaced holes 66, the use of which will also be discussed shortly. The rack body 16 has a thickness T preferably less than one inch (see FIG. 5). In the preferred embodiment, the rack body 16, hold-down bar 20, and the support frame 18 are constructed of a relatively hard plastic such as ABS or polyethylene. However, it is consistent with the principles of the present invention that the rack body can be made from other materials such as steel, aluminum, rubber, or other polymers.

Turning to FIGS. 4 and 5, the hold-down bar 20 is a rigid member with slotted through-holes 68 to receive the fingers 60 and fasteners 70. However, it is consistent with the principles of the present invention that the hold-down bar can be a non-rigid member that securely engages a portion of the rack body 16, such as a flexible strap or bungee cord. The fasteners 70 each include a screw 72 that extends through a bore 74 of the hold-down bar 20 and a wingnut 76 that is threadable onto the screw 72.

As illustrated in FIG. 7, the hold-down bar 20 can be arranged above the rack body 16 so that the slotted through-holes 68 are aligned with the fingers 60 and the screws 72 are aligned with the slots 64. The hold-down bar 20 may then be lowered so that the fingers 60 extend through the hold-down bar 20, as in FIG. 2. The wingnuts 76 may then be tightened so that the hold-down bar 20 is fixed relative to the rack body 16. The wingnuts 76 may subsequently be loosened to allow movement and removal of the hold-down bar 20 relative to the rack body 16. While the hold-down bar 20 is removably securable to the rack body 16, it is within the ambit of the present invention to attach the hold-down bar 20 to the rack body 16 in other ways. For example, the hold-down bar could be hinged to the rack body to permit pivotal movement of the hold-down bar. Also, the fingers of the rack body could include stops to allow sliding movement of the hold-down bar while preventing its removal from the rack body.

Figure 2:
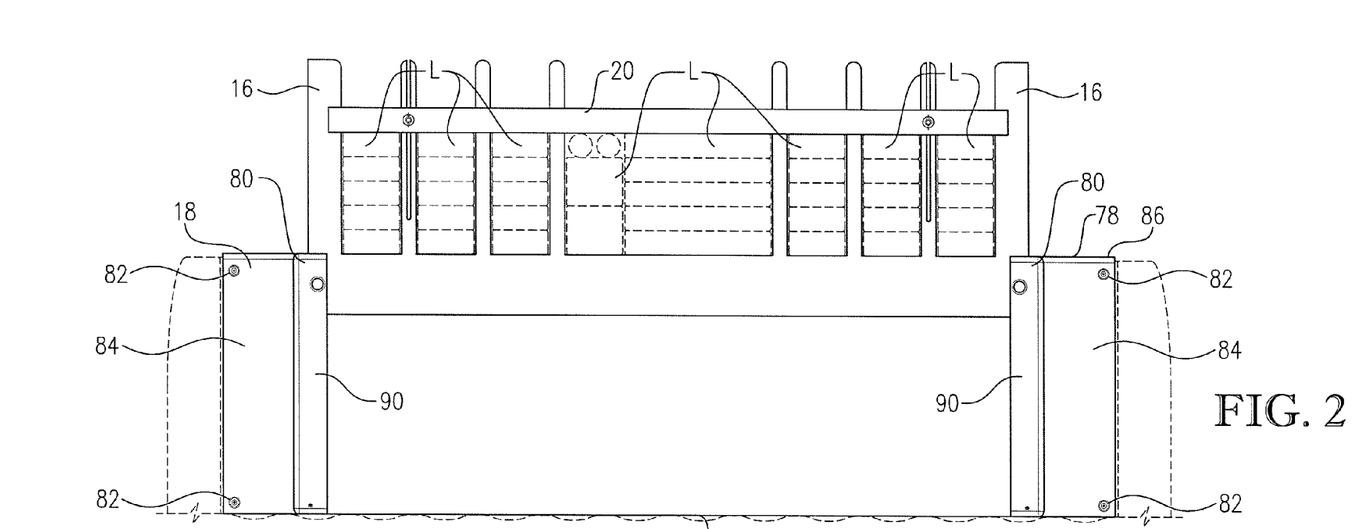
FIG. 2 is a fragmentary front elevation view of the pick-up truck including the holding rack depicted in FIG. 1 with the rack body in a load-supporting position to receive the load.

Turning to FIGS. 2, 4, and 5, the illustrated support frame 18 broadly includes a base 78, guides 80, and fasteners 82. The base 78 includes a planar side portion 84 and a top portion 86 perpendicular to the side portion 84. The planar side portion 84 has a lower edge 88 opposite the top portion 86. In the illustrated embodiment, the support frame 18 is a tailgate liner which covers substantially all of the inner side surface 46 when installed on the tailgate. Most preferably, the support frame 18 includes a relatively uniform layer of material such as ABS or polyethylene. Those of ordinary skill in the art will recognize that the illustrated layer is of similar construction to commercially available tailgate liners. However, it is within the ambit of the present invention to use an alternative framework for the support frame 18, such as an assembly of discrete braces or struts.

The illustrated support frame 18 includes mounting holes (not shown) in base 78 through which fasteners 82 extend to secure the support frame 18 to the rear section 40. However, it is entirely within the ambit of the present invention that the support frame 18 can be mounted relative to the rear section 40 in other ways. For example, the support frame 18 can be mounted by attaching it to the floor 28 with screws, bolts, or other fasteners. Similarly, the support frame 18 can be mounted to sidewalls 34 by being fixed to the interior of the sidewalls 34 with various fasteners. In addition, a portion of the support frame 18 could be fixed within the stake holes 44 to provide alternative support.

Figure 9:
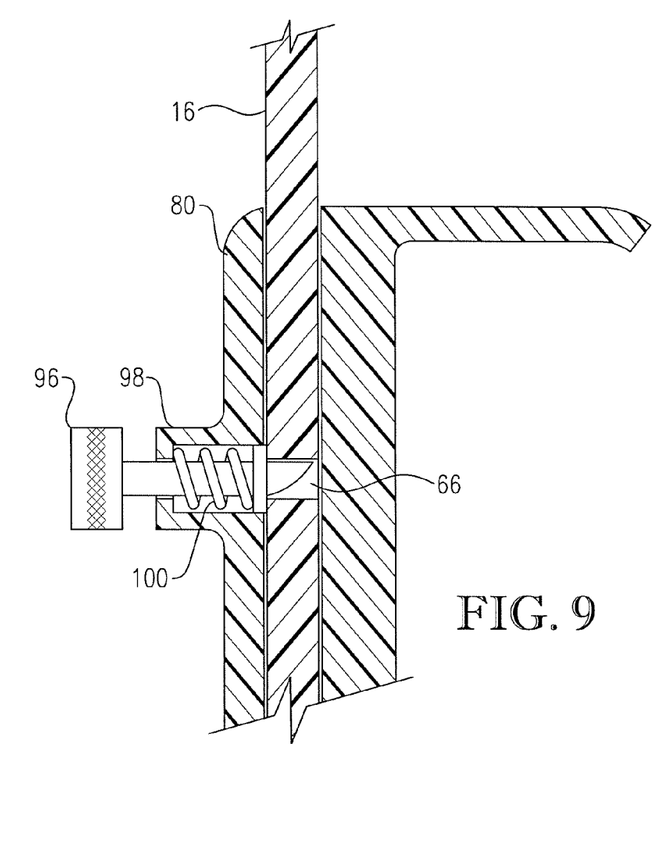
FIG. 9 is a greatly enlarged fragmentary side elevation sectional view of the holding rack illustrated in FIG. 1, showing the rack body held in the load-supporting position by the locking pin.

The guides 80 include spaced apart projections 90 with opposed grooves 92 running along the length of the projections 90. Thus, the projections 90 generally have a channel-shaped cross-section. The grooves 92 are substantially parallel to each other and to the planar side portion 84. The projections 90 extend from the lower edge 88 to the top portion 86 and are generally parallel to each other. The guides 80 also include stops 94 located adjacent the lower edge 88 (see FIG. 8). The illustrated stop 94 is a threaded fastener but those of ordinary skill in the art will appreciate that other fasteners such as a cotter pin could be used instead. As shown in FIG. 9, the guides 80 further include locking pins 96. Each locking pin 96 extends into a respective boss 98 of the projection 90. The pin 96 is biased into an extended position with spring 100.

In the illustrated embodiment, projections 90 are molded to the base 78 to form a unitary construction. However, it is within the scope of the present invention that the projections 90 could be separately formed from the base 78 and later attached thereto with fasteners known by those of ordinary skill in the art. For example, the projections 90 could be fastened to a pre-existing base.

In the preferred embodiment, the support frame 18 is constructed of a relatively hard plastic such as ABS or polyethylene. However, similar to the rack body 16, it is consistent with the principles of the present invention that the support frame 18 can be constructed from other materials such as steel, aluminum, rubber, or other polymers.

The support frame 18 is secured to the rear section 40 by first arranging the support frame 18 so that the planar side portion 84 overlies in generally parallel relationship and substantially spans the inner side surface 46 of the rear section 40. Also, the support frame 18 is arranged so that the top portion 86 overlies the upper edge 50. The support frame 18 is then secured to the rear section 40 with fasteners 82. Those of ordinary skill in the art will appreciate that various kinds of fasteners may be used, such as sheet metal screws, bolts with captive nuts, or toggle bolts. It is also within the ambit of the present invention that the support frame 18 could be fixed to the rear section 40 using other techniques. For example, the frame could be adhesively bonded, it could be welded, or it could be molded to the tailgate. Yet further, the rack body and support frame could be positioned within the tailgate, so that when the tailgate is swung to its horizontal position, a smooth upper surface is presented.

Figure 6:
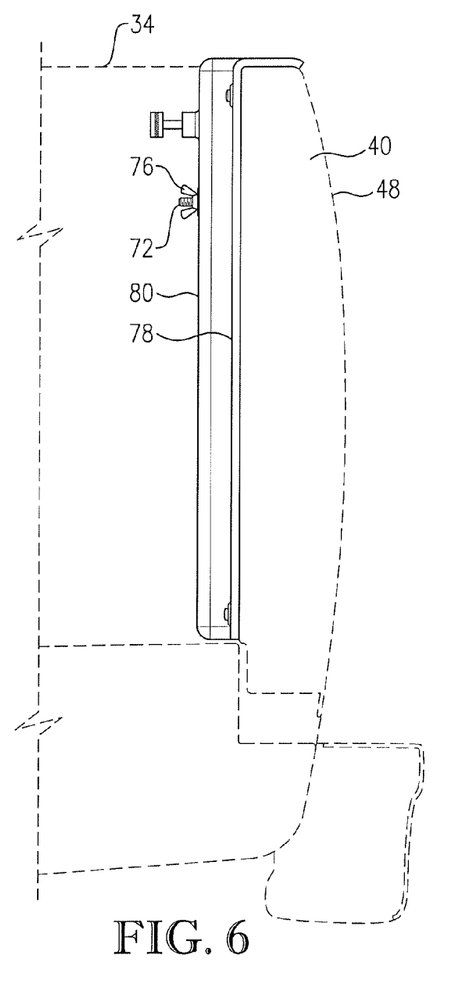
FIG. 6 is an enlarged fragmentary side elevation view of the pick-up truck including the holding rack depicted in FIG. 5 with the rack body in the stored position.
Figure 10:
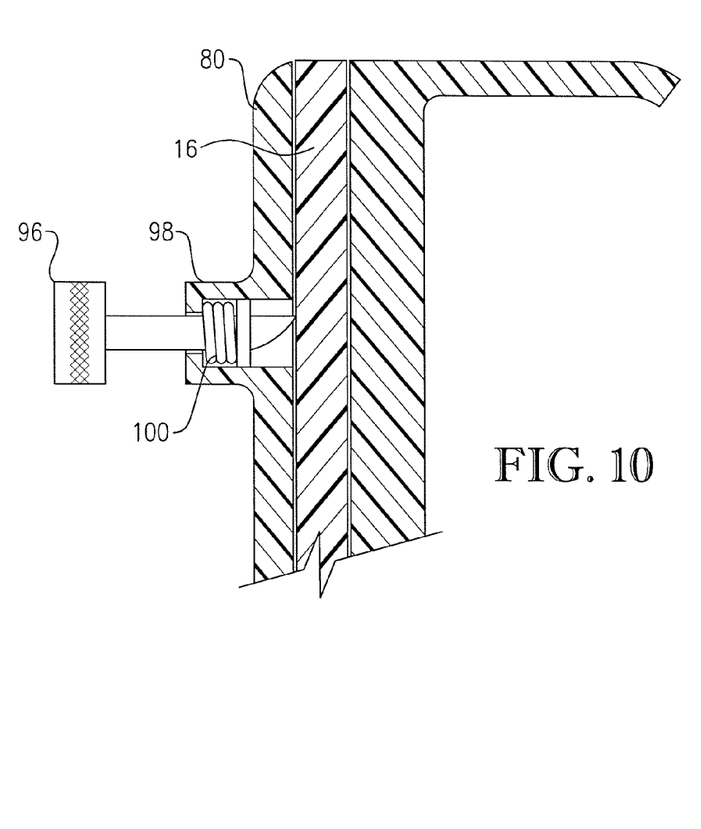
FIG. 10 is a greatly enlarged fragmentary side elevation sectional view of the holding rack illustrated in FIG. 9, showing the rack body in the stored position and the locking pin retracted to disengage the rack body.

The rack body 16 is placed within the support frame 18 by first aligning the section 54 between the grooves 92. The rack body 16 can then slide between the projections 90 and within grooves 92 so that the section 54 moves from the top portion 86 to the lower edge 88. In doing so, the locking pins 96 must be retracted, as shown in FIGS. 6 and 10, from their normally extended position, as shown in FIGS. 5 and 9. The section 54 may be stored relative to the support frame 18 by sliding it toward the lower edge 88 until it contacts the stops 94 (see FIG. 8). In this position, the rack body 16 and the slots 62 are parallel to and entirely spanned by the planar side portion 84 (see FIGS. 3 and 6).

Figure 3:
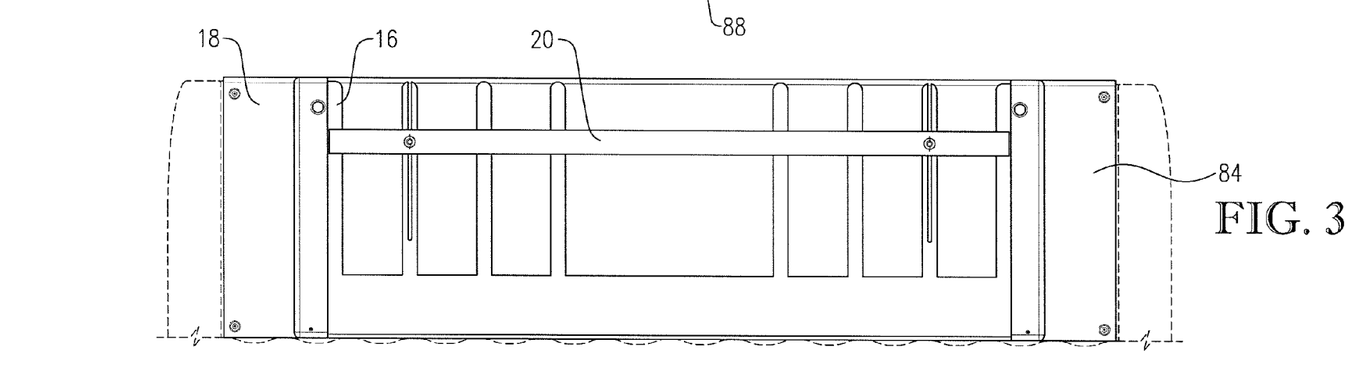
FIG. 3 is a fragmentary front elevation view of the pick-up truck including the holding rack depicted in FIG. 2 with the rack body in a stored position within the truck bed.

The rack body 16 may be extended from the stored position, shown in FIGS. 3 and 6, by raising the rack body 16 so that it slides within grooves 92. When the rack body 16 has moved so that the holes 66 are aligned with the locking pins 96, the locking pins 96 are biased to extend through the respective holes 66 to secure the rack body 16 (see FIGS. 5 and 9). During this movement, the rack body 16 remains substantially parallel to the planar side portion 84. As discussed previously, the illustrated rack body 16 includes the pair of holes 66. However, it is consistent with the principles of the present invention to include additional pairs of holes to be engaged by the locking pins. In this manner, the rack body 16 may be provided with several discrete, secured positions relative to the support frame 18.

The rack body 16 is moveable between stored and load-supporting positions as well as being removable entirely from the support frame 18. As FIG. 10 illustrates, the locking pin 96 is retracted while the rack body 16 is stored. As the rack body 16 is moved up into the load-supporting position, as shown in FIGS. 2 and 5, the locking pin 96 is biased to extend through the hole 66 as previously discussed. The rack body 16 may be moved out of this position by retracting the locking pins 96 from the respective holes 66. Therefore, the rack body 16 has selectable orientations relative to the support frame 18.

With the support frame 18 attached to the rear section 40, the holding rack 10 provides selectable orientations of the rack body 16 relative to the rear section 40. The rack body 16 is placed into the stored position, illustrated in FIGS. 3 and 6, relative to the rear section 40 by sliding it toward the lower edge 88 until it contacts the stops 94. In this position, the rack body 16 is entirely spaced within two inches of the inner side surface 46 so that slots 62 are parallel to and entirely spanned by the inner side surface 46. Consequently, the stored rack body 16 is compactly located within the enclosed storage space 52 and is not oriented to support load L above the enclosed storage space 52.

The rack body 16 is in the load-supporting position, illustrated in FIGS. 2 and 5, when the locking pins 96 extend through the respective holes 66 to secure the rack body 16. In this position, the rack body 16 is oriented to support load L above the enclosed storage space 52. The upper edge 56 of the illustrated rack body 16 is adjacent to the upper edge 50 of the rear section 40. It is consistent with the scope of the present invention that the upper edge 56 of the extended rack body 16 may be positioned above or below the upper edge 50. In this manner, the upper edge 56 of the rack body 16, the upper edge 50 of the rear section 40, or both can substantially support load L in the vertical direction. In the load-supporting position, the rack body 16 remains substantially parallel to the inner side surface 46 and to the planar side portion 84. As discussed previously, the illustrated rack body 16 includes the pair of holes 66. However, it is consistent with the principles of the present invention to include additional pairs of holes to be engaged by the locking pins. In this manner, the rack body 16 may be provided with several discrete, secured positions relative to the rear section 40. Thus, the rack body 16 has selectable orientations, one of which allows the user to support and organize a load L and the other allows the rack body to be compactly stored within the truck bed 12.

In operation, the rack body 16 is shiftable into the load-supporting position spaced above the tailgate from the stored position within the truck bed 12. The load L can then be placed into one of the slots 62 of the rack body 16 when in the load-supporting position so that a first end 102 of the load L is located within the truck bed 12 and supported therein by the floor 28 and a second end 104 of the load L is spaced rearwardly of the truck bed 12. Thus, the holding rack 10 is particularly suited for holding loads that are longer than the truck bed 12 because the load-supporting position of the rack body 16 tends to retain load L within the truck bed 12. This occurs because the rack body 16 is spaced vertically from the floor 28 which tends to force load L toward the end section 38 due to the force of gravity. The illustrated load L includes various sizes of precut lumber as well as tubing. Those skilled in the art will recognize that various kinds of loads could be organized within the holding rack 10 such as extruded sections of metal or plastic, or tools having an elongated shape such as ladders.

The hold-down bar 20 may then be removably attached to the rack body 16 while the load L is in one of the slots 62 and above the load L to prevent upward movement of the load L out of the respective slot 62. The hold-down bar 20 and the rack body 16 preferably restrict movement without compressing the load L. However, it is consistent with the scope of the present invention that the rack body 16 and hold-down bar 20 are configured to compress the load L to more securely hold it relative to the truck bed 12.

Turning to FIGS. 11-14, an alternative embodiment of a holding rack 200 is illustrated. The holding rack 200 is generally similar to the first embodiment except that the rack body rotates between the stored and load-supporting positions instead of sliding between those positions. Therefore, it shall be sufficient to describe the holding rack 200 primarily with respect to these differences.

The holding rack 200 broadly includes an alternative rack body 202, a hold-down bar 204, and an alternative support frame 206. The illustrated rack body 202 includes a lateral section 208 and fingers 210 that form slots 212. The rack body 202 also includes a pair of laterally extending pins 214 fixed to the section 208 for rotatably securing the rack body 202 to the support frame 206 as will be discussed below in more detail.

The alternative support frame 206 includes a base 216, fasteners 218, a locking mechanism 220, and oppositely spaced hinge mounts 222. The base 216 includes a planar side portion 224 and top portion 226. The base 216 further includes mounting holes (not shown) through which fasteners 218 extend to secure the support frame 206 to tailgate 228.

The hinge mounts 222 project from the side portion 224 and present through-holes 230 for receiving pins 214 as will be discussed shortly. The illustrated hinge mounts 222 are molded into the base 216 to create a unitary construction. However, it is consistent with the scope of the present invention that the hinge mounts can be fastened to the base 216 using other methods.

The locking mechanism 220 as illustrated, includes a bar 232 that is pivotally mounted to the base 216 using a fastener 234. However, it will be appreciated that hinge mounts 222 or their corresponding hinges may be sufficiently spring loaded so that when the rack body is shifted to the load supporting position the hinges will be of sufficient strength to retain the rack body in that position.

The rack body 202 is shiftably attached to the support frame 206 by aligning the pins 214 with respective holes 230. When attached to the support frame 206, the rack body 202 pivots between stored and load-supporting positions.

Figure 11:
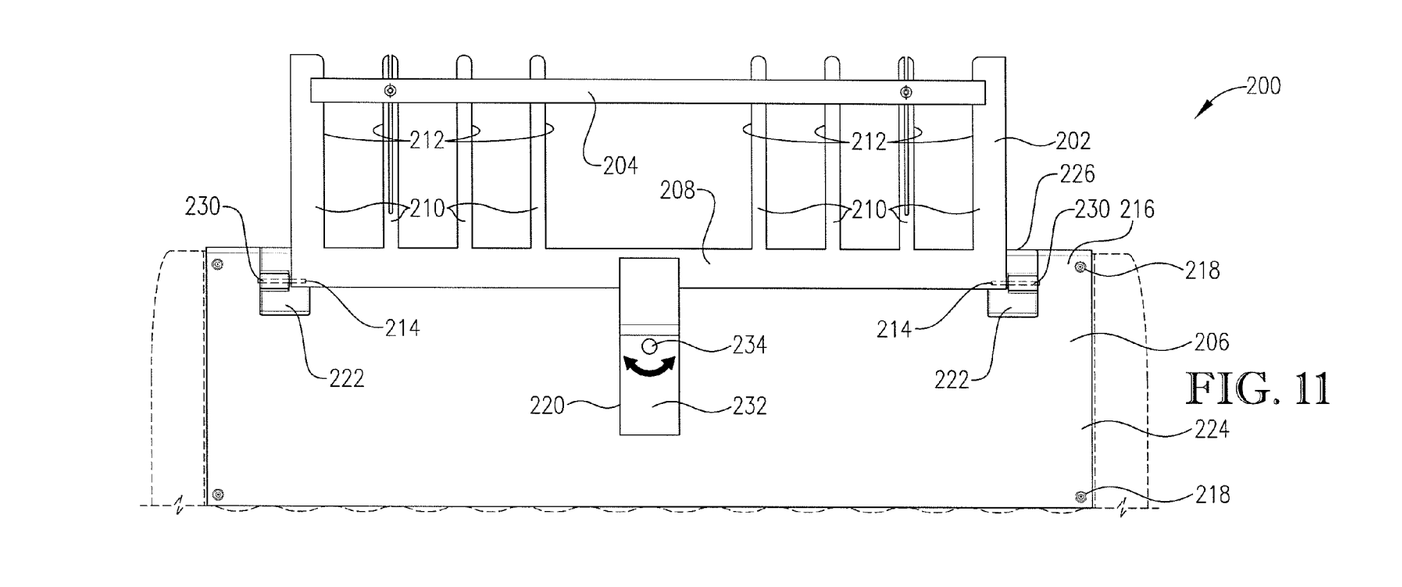
FIG. 11 is a fragmentary front elevation view of an alternative embodiment of the pick-up truck including the holding rack with the rack body in the load-supporting position.
Figures 13, 14:
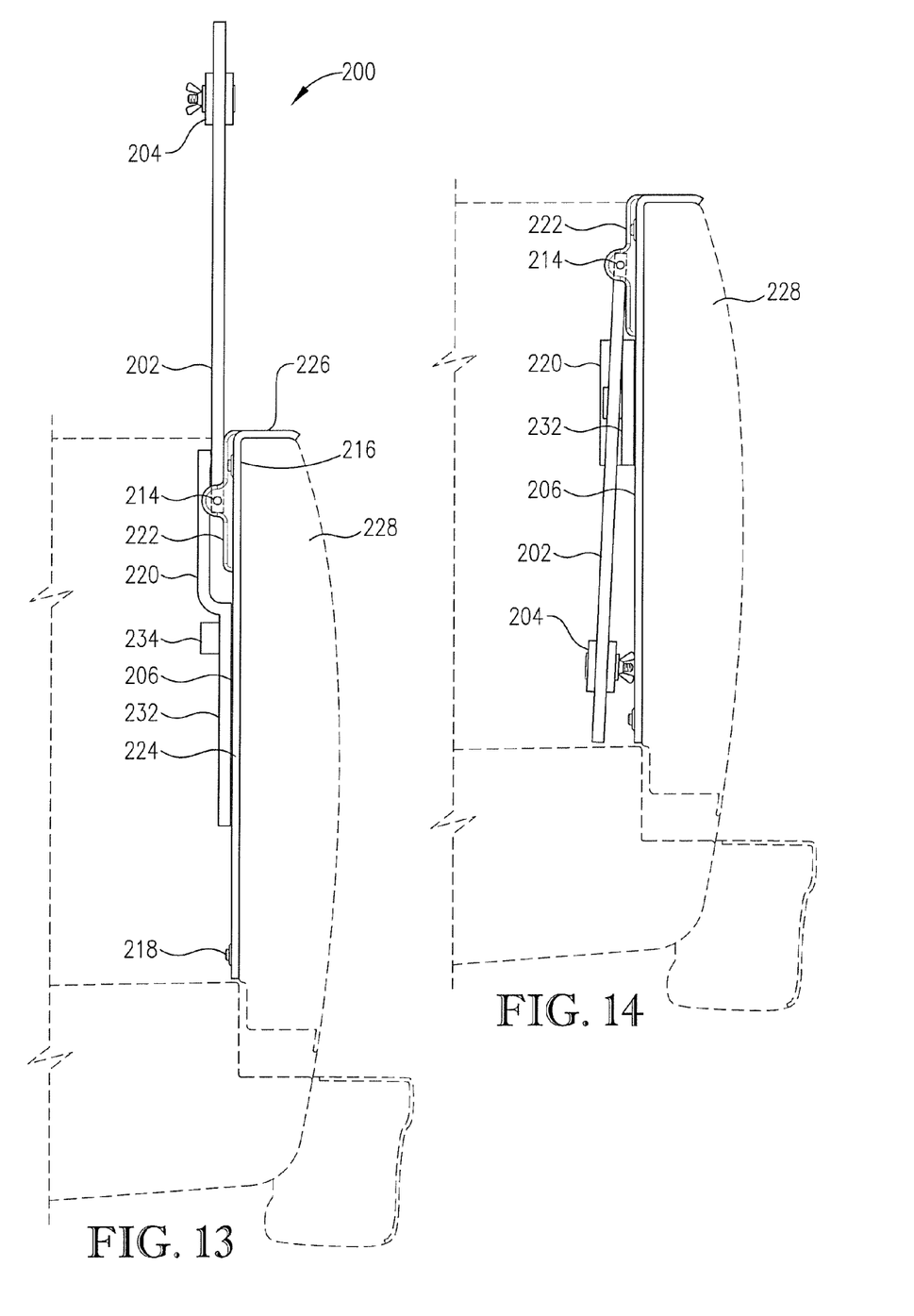
FIG. 13 is a fragmentary side elevation view of the pick-up truck including the holding rack of FIG. 11, showing the rack body in the load-supporting position.
FIG. 14 is a fragmentary side elevation view of the pick-up truck including the holding rack of FIG. 11, showing the rack body in the stored position.

Turning to FIGS. 11 and 13, the rack body 202 is illustrated in the load-supporting position where the rack body 202 is upright and extends above tailgate 228. The fingers 210 point upward so that slots 212 may receive the load L. In this position, the bar 232 is rotated to engage and prevent rotation of the rack body 202 or the hinges may perform the function of preventing rotation.

Figure 12:
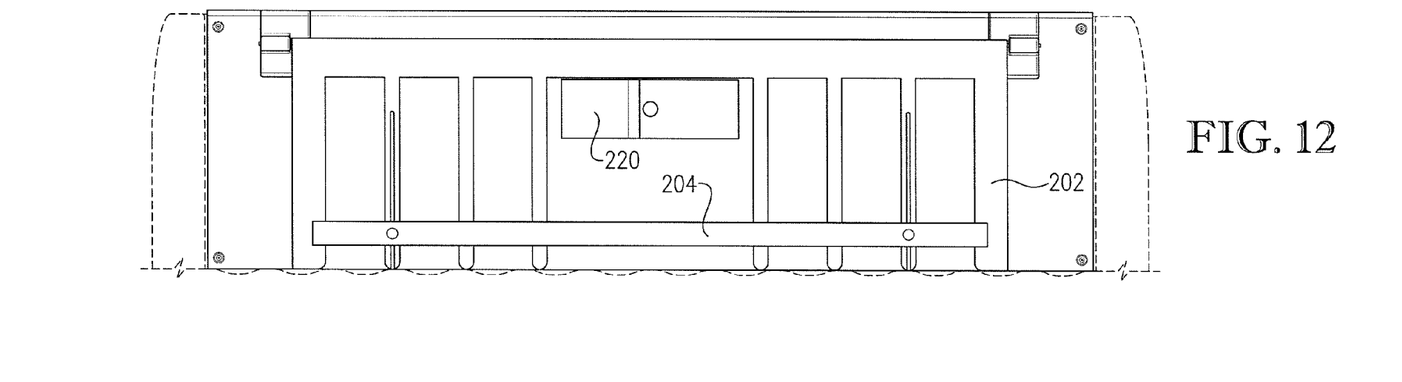
FIG. 12 is a fragmentary front elevation view of the pick-up truck including the holding rack of FIG. 11, showing the rack body rotated into the stored position.

Turning to FIGS. 12 and 14, the rack body 202 is illustrated in the stored position where the rack body 202 has rotated downward (relative to the load-supporting position) and below the top portion 226. In this position, the rack body 202 is upright, but the fingers 210 point downward. The bar 232 is rotated so that it does not interfere with the rack body 202 in the stored position.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A wheeled vehicle for securely hauling a load that is supported on the vehicle, said wheeled vehicle comprising:
   a truck bed including a floor with spaced apart forward and rearward ends and a sidewall extending along a periphery of the floor;
   said sidewall presenting a rear section extending along the rearward end of the bed,
   said rear section presenting a laterally extending upper edge and an exposed interior surface that extends from the upper edge downwardly toward the floor; and
   a holding rack operable to secure the load,
   said holding rack including a rack body being shiftably coupled relative to the interior surface to be shiftable between a stored position and a load-supporting position,
   said holding rack further including a support frame fixed to and spaced forwardly of the interior surface to receive the rack body and shiftably couple the rack body relative to the interior surface,
   said rack body being slidably coupled to the support frame,
   said support frame including a spring-biased locking pin that releasably engages the rack body to prevent sliding movement of the rack body relative to the support frame,
   said rack body defining a plurality of slots spaced along a rearward end and configured to receive and support the load therein,
   said rack body being positioned below the upper edge and alongside the interior surface in a generally parallel relationship thereto so that the rack body is located entirely within the truck bed when said rack body is in the stored position,
   said rack body extending uprightly above the upper edge and the truck bed when in the load-supporting position for supporting the load.

2. The wheeled vehicle of claim 1,
   said rack body having a plurality of load-engaging positions relative to the support frame where the locking pin engages the rack body to prevent movement relative to the support frame.

3. The wheeled vehicle of claim 1,
   said support frame including a tailgate liner that is configured to cover substantially all of the interior surface.

4. The wheeled vehicle of claim 1, and
   a hold-down bar being removably coupled to and extending along the rack body for releasably securing the load within at least one of said slots.

5. The wheeled vehicle of claim 1,
   said rack body having a thickness of less than about 1 inch.

6. The wheeled vehicle of claim 1,
   said rack body being entirely spaced within 2 inches of the interior surface when in the stored position.

7. The wheeled vehicle of claim 1,
   said rear section forming a tailgate,
   said tailgate being swingable between open and closed positions,
   said interior surface being generally vertical when the tailgate is in the closed position and generally horizontal when the tailgate is in the open position.

8. A wheeled vehicle for securely hauling a load that is supported on the vehicle, said wheeled vehicle comprising:
   a truck bed including a floor with spaced apart forward and rearward ends and a sidewall extending along a periphery of the floor;
   said sidewall presenting a rear section extending along the rearward end of the bed,
   said rear section presenting a laterally extending upper edge and an exposed interior surface that extends from the upper edge downwardly toward the floor; and
   a holding rack operable to secure the load,
   said holding rack including a support frame and a rack body shiftably coupled relative to the support frame to be shiftable between a stored position and a load-supporting position,
   said rack body defining a plurality of slots spaced along a rearward end and configured to receive and support the load therein,
   said rack body being positioned below the upper edge and alongside the interior surface in a generally parallel relationship thereto so that the rack body is located entirely within the truck bed when said rack body is in the stored position,
   said rack body extending uprightly above the upper edge and the truck bed when in the load-supporting position for supporting the load
   said support frame being a tailgate liner,
   said tailgate liner being fixed to and spaced forwardly of the interior surface to receive the rack body and shiftably couple the rack body relative to the interior surface,
   said rack body being slidably coupled to the tailgate liner,
   said holding rack including a spring-biased locking pin that engages the rack body to prevent sliding movement of the rack body relative to the tailgate liner.

9. The wheeled vehicle of claim 8,
   said rack body having a plurality of load-engaging positions relative to the tailgate liner where the locking pin engages the rack body to prevent movement relative to the tailgate liner.

10. The wheeled vehicle of claim 8, and
    a hold-down bar being removably coupled to and extending along the rack body for releasably securing the load within at least one of said slots.

11. The wheeled vehicle of claim 8,
    said rack body having a thickness of less than about 1 inch.

12. The wheeled vehicle of claim 8,
    said rack body being entirely spaced within 2 inches of the interior surface when in the stored position.

13. The wheeled vehicle of claim 8,
    said rear section forming a tailgate,
    said tailgate being swingable between open and closed positions,
    said interior surface being generally vertical when the tailgate is in the closed position and generally horizontal when the tailgate is in the open position.

* * * * *